(12) United States Patent
Alexander et al.

(10) Patent No.: US 7,744,018 B2
(45) Date of Patent: Jun. 29, 2010

(54) HIGH PRESSURE HYDRAULIC SYSTEM WITH HOSE FITTINGS FOR DIFFUSING PRESSURE BUILDUP UPON UNCOUPLING

(75) Inventors: Gus Alexander, Inverness, IL (US); Morgan McCarthy, Hoffman Estates, IL (US); John Pianetto, Hoffman Estates, IL (US)

(73) Assignee: FAIP North America, Inc., Elk Grove Village, IL (US)

( * ) Notice: Subject to any disclaimer, the term of this patent is extended or adjusted under 35 U.S.C. 154(b) by 423 days.

(21) Appl. No.: 11/804,365

(22) Filed: May 18, 2007

(65) Prior Publication Data

US 2007/0284461 A1 Dec. 13, 2007

Related U.S. Application Data

(60) Provisional application No. 60/809,600, filed on May 30, 2006.

(51) Int. Cl.
*B05B 9/03* (2006.01)
*B05B 9/01* (2006.01)
*B05B 9/00* (2006.01)
*B05B 15/00* (2006.01)

(52) U.S. Cl. .................. 239/124; 239/526; 239/588; 239/600; 285/13; 285/376; 285/924

(58) Field of Classification Search .......... 239/124, 239/526, 588, 600; 285/13, 14, 249, 375–377; 137/614–614.06; 251/149.1–149.9
See application file for complete search history.

(56) References Cited

U.S. PATENT DOCUMENTS

| | | | |
|---|---|---|---|
| 3,507,523 A * | 4/1970 | Cadley | 285/307 |
| 4,030,778 A * | 6/1977 | Kaut, Jr. | 285/148.16 |
| 5,087,086 A * | 2/1992 | Snedeker | 285/361 |
| 5,135,264 A * | 8/1992 | Elliott-Moore | 285/2 |
| 5,174,610 A | 12/1992 | Svendsen et al. | |
| 5,263,646 A | 11/1993 | McCauley | |
| 5,301,877 A | 4/1994 | Madison | |
| 5,624,074 A | 4/1997 | Parisi | |
| 5,964,409 A | 10/1999 | Alexander et al. | |
| 6,382,251 B1 * | 5/2002 | Hopson | 137/614.05 |
| 6,619,570 B1 | 9/2003 | Ericksen et al. | |
| 6,779,745 B2 | 8/2004 | Alexander et al. | |
| 6,916,008 B2 * | 7/2005 | Noble et al. | 251/149.6 |
| 2004/0140376 A1 * | 7/2004 | Alexander et al. | 239/588 |
| 2006/0181079 A1 * | 8/2006 | Gilpatrick et al. | 285/308 |

\* cited by examiner

*Primary Examiner*—Darren W Gorman
(74) *Attorney, Agent, or Firm*—Cook Alex Ltd.

(57) ABSTRACT

A power operated pressure washer having a high pressure liquid supply hose with an inlet fitting formed with an axial stem having a central liquid passageway that can be connected to a pressure washer outlet fitting by a threaded retaining ring. As a feature of this invention, the retaining ring can be unscrewed from the pressure washer outlet for permitting the dissipation and venting of high pressure buildup within the hose while the retaining ring safely retains the hose fitting on the outlet. In one embodiment, the stem has a pair of axially spaced annular sealing members adaptable for sealing engagement with relatively smaller and larger size pressure washer outlets and the stems is formed with a transverse passageway for venting liquid from the central stem passageway around one of the sealing members, as an incident to unscrewing of the retaining ring, while the other sealing member remains in sealed engagement with the pressure washer outlet fitting.

16 Claims, 5 Drawing Sheets

HIGH PRESSURE HYDRAULIC SYSTEM WITH HOSE FITTINGS FOR DIFFUSING PRESSURE BUILDUP UPON UNCOUPLING

CROSS-REFERENCE TO RELATED APPLICATIONS

This patent application claims the benefit of U.S. Provisional Patent Application No. 60/809,600, filed May 30, 2006, which is incorporated by reference.

FIELD OF THE INVENTION

The present invention relates generally to high pressure hose, and more particularly, to couplings for releasably connecting hose in high pressure hydraulic systems, such as hose used for connecting a pressure washer to a spray gun used for dispensing high pressure liquid generated by the pressure washer.

BACKGROUND OF THE INVENTION

Various forms of couplings are utilized for connecting high pressure hose to items, such as a pressure washer and dispensing gun, in high pressure hydraulic systems. In such systems, it is important that the couplings enable sealed connection between the hose and the pressure washer or spray gun for safe and reliable operation. From an economic and convenience standpoint, particularly in consumer operated pressure washer products, it is desirable that the hose couplings also permit use with various sized inlet and outlet fittings of the pressure washer and spray guns with which the hose is used. U.S. Pat. No. 6,779,745, assigned to the same assignee as the present application, the disclosure of which is incorporated herein by reference, discloses a high pressure hose with couplings adapted for versatile usage with different sized inlet and outlet fittings.

It is not only necessary that the couplings permit reliable safe connection of the hose to the pressure washer or spray gun, but that they enable safe uncoupling and disconnection of the hose in such systems, which can remain substantially pressurized following usage. For example, in pressure washer systems, following use of the pressure washer, it is common for pressure within the hose downstream of the pressure washer to remain at several thousand psi. Hence, uncoupling of the hose from the pressure washer under such conditions can create a danger to the user by virtue of sudden high pressure discharge from the coupling upon disconnection.

OBJECT AND SUMMARY OF THE INVENTION

It is an object of the present invention to provide high pressure hydraulic system with hose having couplings adapted for reliable safe coupling of the hose to an associated component in a high pressure system, as well as safe uncoupling of the hose from the component when the system remains in a highly-pressurized state.

Another object is to provide a high pressure hose as characterized above having couplings which permit uncoupling from a component of a high pressure liquid system without a dangerous sudden burst of high pressure fluid during such uncoupling.

A further object is to provide a high pressure hose of the foregoing type having couplings which are adapted to gradually diffuse high pressure liquid within the system during loosening and disconnection of the coupling from a component of a system following usage.

Still another object is to provide a high pressure hose of the foregoing type in which the couplings are universally adaptable for use with multiple sized fittings of associated components of a pressurized liquid system.

Yet a further object is to provide a high pressure hose of such type in which the couplings are adapted for economical manufacture and easy and reliable usage.

Other objects and advantages of the invention will become apparent upon reading the following detailed description and upon reference to the drawings, in which:

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Figures 1, 3A:
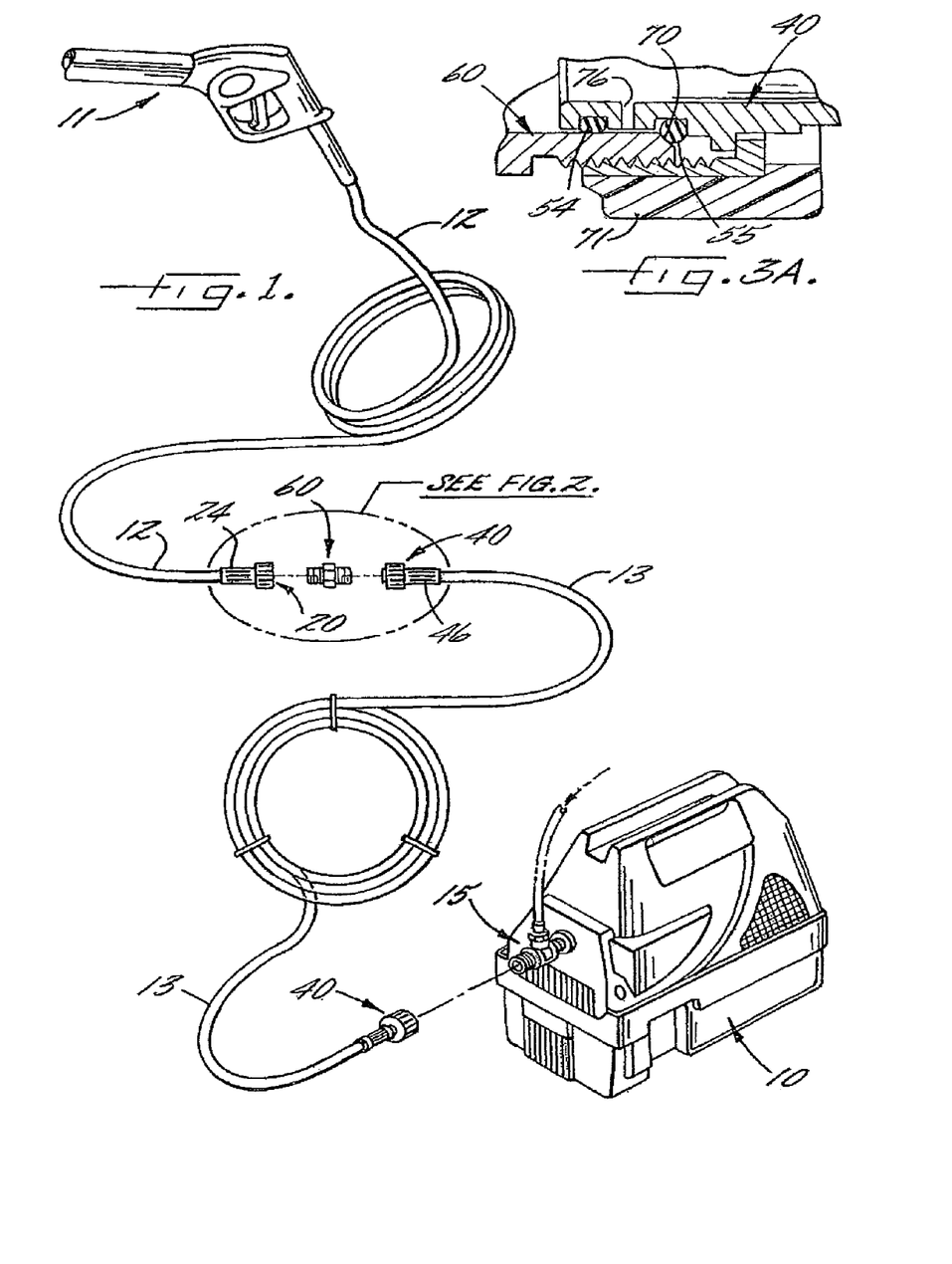
FIG. 1 is an exploded perspective of a pressure washer with a high pressure extension hose in accordance with the invention connected between the pressure washer and the hose of a spray gun that controls liquid discharge from the pressure washer.
FIG. 3*a* is an enlarged fragmentary section illustrating the break of a seal and venting of high pressure liquid from the system as an incident to disconnection of the coupling as shown in FIG. 3.
Figure 11:
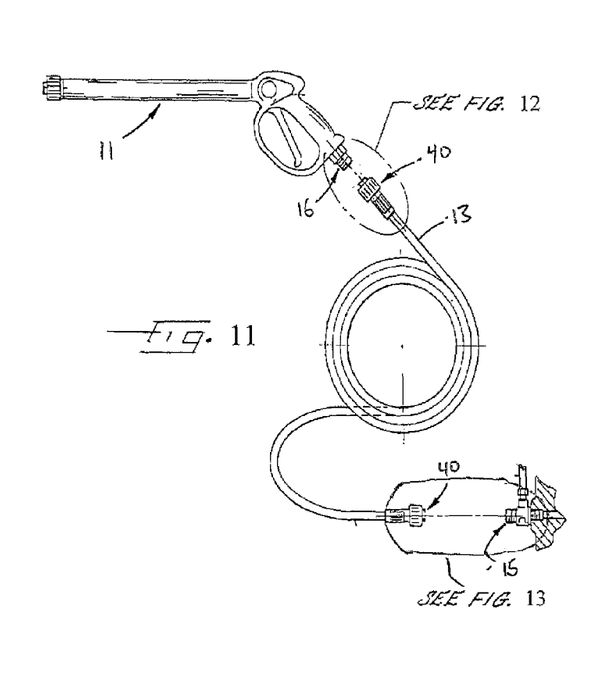
FIG. 11 is a depiction of the extension hose in accordance with the invention being used between a spray gun and pressure washer.

Referring now more particularly to FIG. 1 of the drawings, there is shown an illustrative high pressure hydraulic system which includes a pressure washer 10, a spray gun 11 having a flexible high pressure hose 12, and an extension hose 13 connected between the pressure washer 10 and the spray gun hose 12. The illustrated spray gun 11 is permanently secured to the downstream end of the flexible pressure washer hose 12, which like the extension hose 13, may be of a flexible reinforced construction of a known type suitable for withstanding liquid pressures generated by the pressure washer. The pressure washer 10 may be of a conventional type which has a gasoline or electric powered motor for operating a pump to generate a high pressure liquid discharge. The pressure washer 10 in this case has an outlet fitting 15 which may be of a conventional type, as disclosed in the afore-referenced patent. FIG. 11 illustrates an alternate system where the outlet fitting 15 of the pressure washer is connected via extension hose 13 to fitting 16 of spray gun 11.

Figure 2:
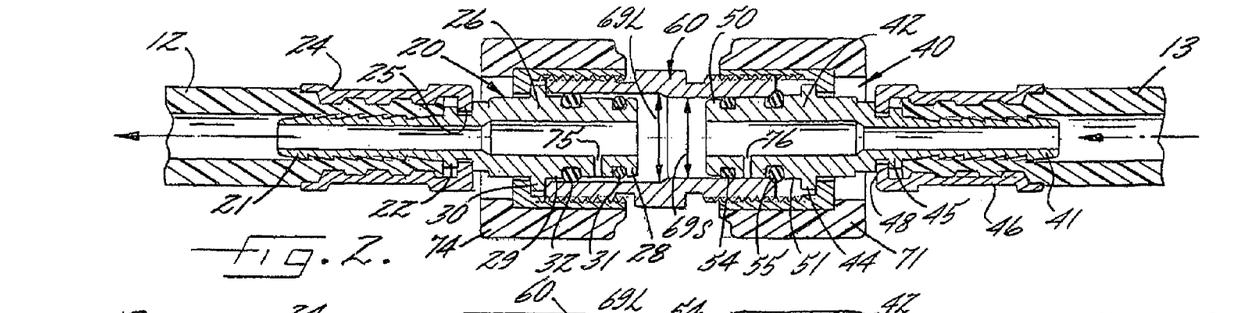
FIG. 2 is an enlarged fragmentary section of a coupling in accordance with the invention connecting the extension and spray gun hoses.

For enabling connection of the spray gun hose 12 to the extension hose 13, or directly to the pressure washer outlet fitting 15, the spray gun hose 12 has a fitting 20 fixedly secured to the upstream end thereof. The fitting 20, as depicted in FIG. 2, has a ribbed shank 21 that is forceably positioned into the end of the hose 12 up to and against a radial locating flange 22 of the fitting 20. For positively securing the fitting 20 in the hose 12, an annular ferule 24 is positioned about the end of the hose and has an annular retaining flange 25 that is deformed into an annular retaining groove of the fitting immediately adjacent the locating flange 22. The fitting 20 has an outwardly extending connecting stem 26 which in this case includes a smaller diameter outer hub portion 28 and a relatively larger inner hub portion 29 adjacent a radial retaining flange 30. The stem 26 carries a pair of axially-spaced o-rings 31,32 within respective outwardly opening annular grooves formed in the stem. The outer o-ring 31 in this case has a smaller diameter than the o-ring 32.

The illustrated extension hose 13 comprises a length of connector high pressure hose with connecting fittings 40 at its opposite ends which are identical in construction, and in this case, similar to the spray gun hose fitting 20. The connecting fitting 40 has a hose connecting stem 41 at one end, a mating stem 42 at the other end, and an outwardly extending retaining flange 44. The hose connecting stem 41 is a relatively small diameter ribbed member over which the hose is forcefully positioned into abutting relation to a locator flange 45. For positively affixing the stem 41 to the hose 13, a ferrule 46 is provided, which has a radial end wall 48 that is crimped cramped inwardly into an annular groove of the fitting 40 with the hose interposed there between. The mating stem 42 of the extension hose fitting 40 has a relatively small diameter terminal outer hub portion 50 and a larger diameter inner hub portion 51 and carries a pair of o-ring 54,55 in outwardly opening axially spaced grooves, with the outer o-ring 54 being smaller in diameter than the inner o-ring 55.

For enabling releasable connection of the spray gun hose 12 with the extension hose 13, an adapter 60 is provided which may be substantially similar to the adapter disclosed in the afore-referenced patent. The illustrated adaptor 60 has a central hub portion 61 with externally threaded cylindrical extensions 62,64 of common diameter extending coaxially outwardly from opposite sides of the hub 61. The adaptor 60 is formed with an axial flow passage 69 which in this case comprises two separate cylindrical chambers 69S, 69L each communicating with each other from opposite ends of the adaptor. As set forth in detail in the aforesaid referenced patent, the chamber 69S has a relatively small diameter (i.e., 14 mm.) corresponding to a smaller diameter pressure washer outlet and the second chamber 69L has a relatively larger diameter (i.e., 15 mm.) corresponding to a relatively larger diameter pressure washer outlet. It will be understood that to assist in understanding certain of the discussions herein, references to pressure washers having a 14 mm. discharge outlet and components designed for use therewith sometimes have been designated with the appropriate reference numeral and the distinguishing suffix "S" (for small or 14 mm.). The larger 15 mm. pressure washer discharge outlet and components designed for use therewith sometimes have been designated with the appropriate reference numeral with the distinguishing suffix "L" (for large or 15 mm.).

The extension hose fitting 40 in this case, as shown in FIG. 2, is secured within the smaller diameter inlet chamber 69S of the adapter 60, and the extension hose fitting 20 is secured within the relatively larger diameter inlet chamber 69L of the adapter. With the extension hose fitting stem 42 positioned in the relatively smaller diameter chamber 69S, the smaller diameter annular seal 55 is in sealing engagement with an inner wall of the chamber 69S and the larger diameter o-ring 55 is forced into sealing engagement with a chamfered annular end 70 the adapter 60. For securing the extension hose fitting 20 within the adapter chamber 69S, a threaded retainer ring 71 is provided about the end of the extension hose 13, which engages the radial retaining flange 44 and draws in it to captive position as an incident to threaded engagement of the retainer ring 71 onto an externally threaded end of the adapter 60.

The spray gun hose fitting 20, as also depicted in FIG. 2, can be similarly connected to the adapter 60, with the stem 26 being positioned in the larger diameter inlet chamber 69L. The smaller and larger diameter hub portions 28,29 of the stem 26 in this case both are positionable into the larger diameter chamber 69L with the larger diameter o-ring 32 being in sealing engagement with an internal wall of the chamber 69L and the smaller diameter o-ring 31 guiding positionable movement of the stem 26 into the adapter 69L. A threaded retainer ring 74 similarly is threadably engageable with an externally threaded end of the adapter 60 drawing the spray gun hose fitting 20 into captive secure relation to the adapter 60.

During operation of the pressure washer 10, the adapter 60 enables reliable high pressure communication of liquid from the pressure washer 10 through the extension hose 13 and spray gun hose 12 for controlled discharge and direction by the spray gun 11. As indicated above, following operation of the pressure washer, a high pressure buildup remaining in the extension and pressure washer hoses can cause a sudden dangerous outburst of high pressure liquid upon disconnecting the hoses from the adapter or other fittings in the system.

In accordance with the invention, the hose fittings are adapted for gradually releasing a high pressure buildup within the hoses as an incident to uncoupling of the fittings so as to prevent injury to persons from sudden high pressure discharge. More particularly, the fittings have venting apertures which permit gradual venting and decompression of pressure buildup from the high pressure hoses while the retaining caps remain in secure threaded engagement with the coupling adapter. To this end, in the illustrated embodiment, the fittings 20, 40 each have a respective radial venting passageway 75,76 that communicates from the central liquid flow passage 69 of the adapter to an outer radial location between the axially spaced o-rings of the respective stem.

Figures 3, 4:
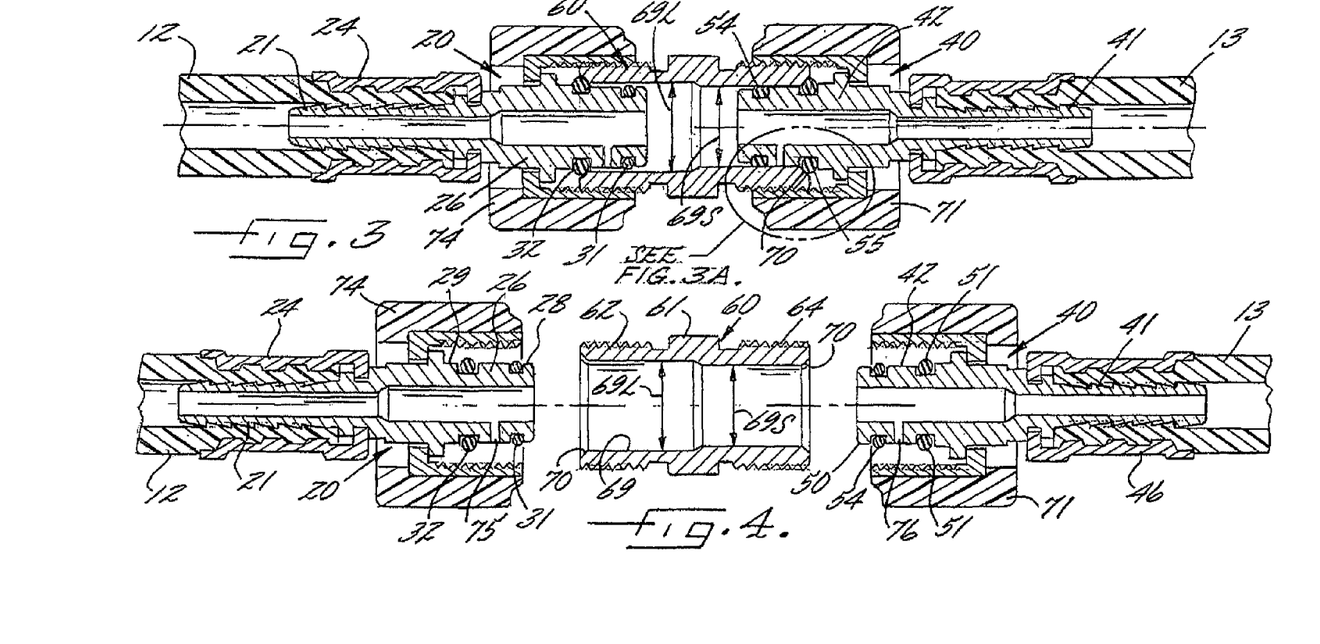
FIG. 3 is a fragmentary section, similar to FIG. 2, showing the hose coupling in a partially uncoupled condition, that permits safe venting of high pressure liquid within the system.
FIG. 4 is a fragmentary section, similar to FIGS. 2 and 3, showing the hoses fully disassembled from the coupling.

The radial venting passageway 76 of the extension hose fitting 40 communicates between the internal flow passageway 69 and outer location between the o-rings 54,55. Upon loosening of the retaining ring 71, as depicted in FIGS. 3 and 3A, such as one or two turns, trapped pressure within the system tends to push the fitting 20 outwardly of the adapter 60 breaking the seal between the outer o-ring 55 and the chamfered end 70 of the adapter 60. With the seal broken, high pressure will dissipate in a controlled fashion through the venting passageway 76 and between the o-ring 55 and chamfered edge 70 to atmosphere to gradually relieve the internal pressure. As an important aspect of the invention, it will be understood that it is important that the threaded connection between the retaining ring 71 and the adapter 60 is long enough to permit unscrewing of the retainer ring 71 a sufficient distance to break the seal between the o-ring 55 and the adapter chamfered end 70, while the retaining ring 71 continues to securely retain the retainer ring 71 on the adapter 60. This enables the slight break in the seal to be maintained sufficient to dissipate the pressure buildup without sudden outburst of pressurized liquid from the coupling. When the pressure buildup has fully dissipated, continued unscrewing of the retainer ring permits the extension hose fitting 40 to be removed from the adapter 60, as depicted in FIG. 4.

In keeping with the invention, the spray gun hose fitting 20 similarly may be uncoupled from the adapter 60 while in a pressurized state, without sudden harmful discharge of high pressure fluid. In this case, the retainer ring 74 must be turned a sufficient number of turns to enable pressure within the system to move the stem 26 outwardly to the point that the seal is broken from between the o-ring 32 and the internal wall of the adapter chamber 69L, as depicted in FIG. 3, thereby enabling high pressure fluid to be gradually dissipate in a controlled manner both from 1) the venting passageway 75 of the fitting 20, and 2) the small space between the smaller o-ring 31 and the inner wall of the adapter chamber 69L for ultimate escape to atmosphere through the broken seal between the larger o-ring 32 and the end of the adapter. Again, venting of high pressure buildup occurs while the retaining ring 74 remains in secure threaded engagement with the adapter 60. Once the pressure buildup has been dissipated in such controlled and gradual fashion, the retainer ring 74 can be unscrewed further to remove the fitting 20 from the adapter 60, as depicted in FIG. 4.

Figure 12:
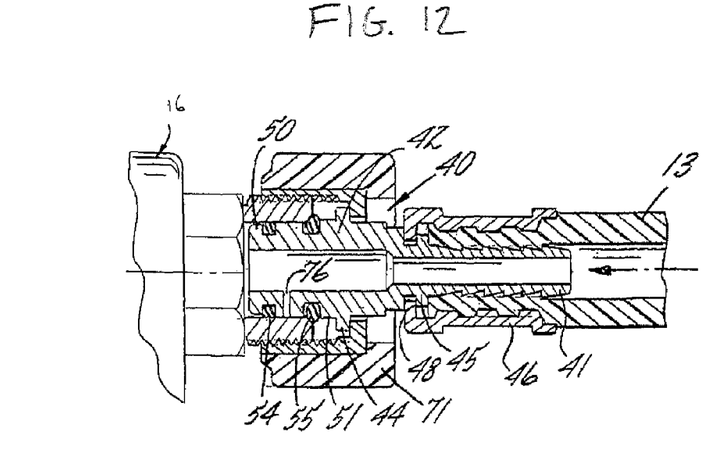
FIG. 12 is an enlarged fragmentary section showing the hose in FIG. 11 being connected to a spray gun inlet fitting.
Figure 13:
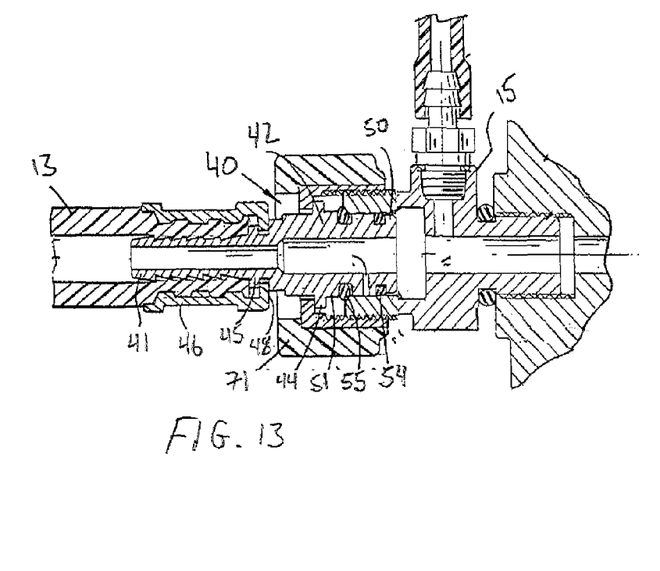
FIG. 13 is an enlarged fragmentary section showing the hose in FIG. 11 being connected to a pressure washer outlet fitting.

In keeping with the invention, it will be understood that the spray gun and extension hose fittings 20,40 may be universally used with different sized outlet fittings of the pressure washer 10 or fittings of other components of a pressurized hydraulic system such as the fitting 16 of spray gun 11 (see FIGS. 11 and 12). For example, if the extension hose fitting 20 or 40 is to be connected to a smaller diameter outlet fitting of the pressure washer, such outlet having a 14 mm. diameter, the fitting may be connected to the outlet in the manner shown in FIG. 13 with the o-rings 54, 55 creating a redundant seal when assembled, and with the venting passage 76 of the stem enabling gradual pressure discharge upon unloosening of the retaining ring from the outlet a sufficient distance to break the seal between the larger diameter o-ring 55 and the adapter 60, while the retaining ring 71 retains threaded engagement with the outlet. Likewise, when the fitting 20 or 40 is used with a relatively larger diameter outlet fitting, such as a 15 mm. diameter outlet, the fitting may be connected to the outlet in the same manner that the fitting 20 connects to the larger diameter outlet chamber 69L in FIG. 2, with the larger diameter seal 32 being in sealing engagement within an internal wall chamber 69L and which upon loosening of the retaining cap, permits controlled venting both through the venting aperture 75 and from the smaller diameter o-ring 32 and the adapter.

Figure 5:
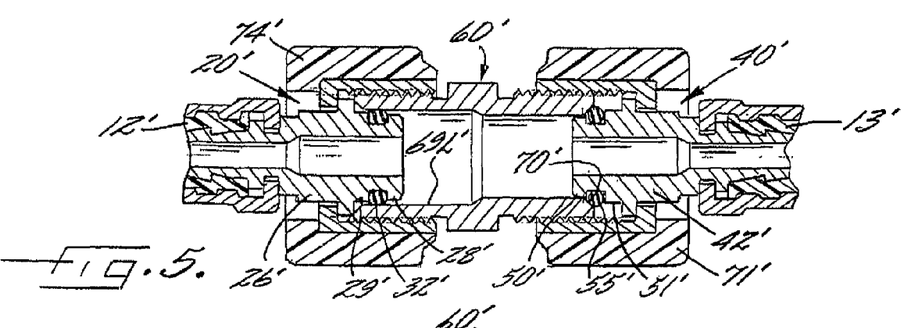
FIGS. 5-7 are fragmentary sections, similar to FIGS. 2-4, showing an alternative embodiment of hose coupling in accordance with the invention.
Figure 6:
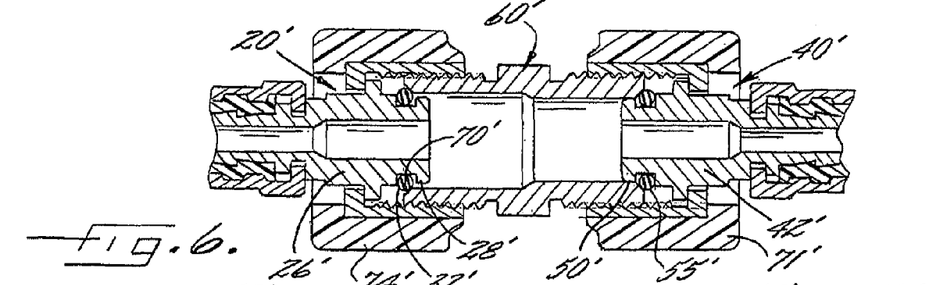
Figure 7:
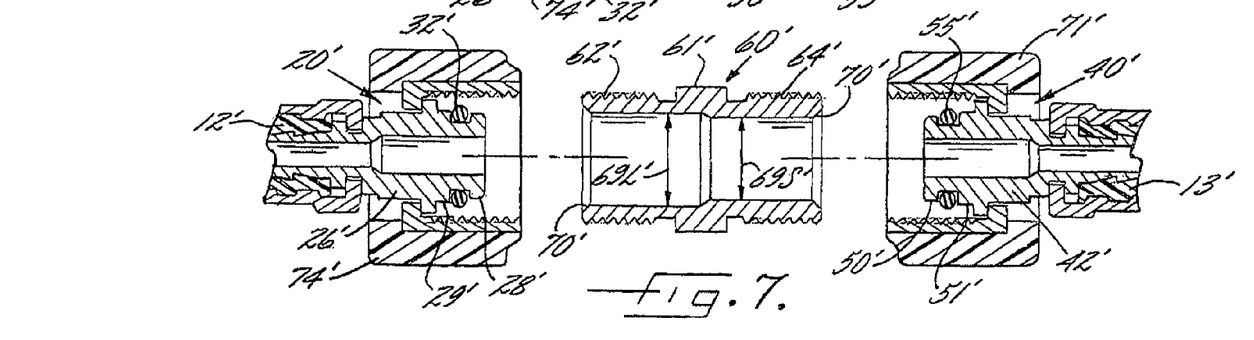

With reference to FIGS. 5-7, an alternative coupling arrangement is shown wherein items similar to those described above have been given similar reference numerals with the distinguishing suffix prime (') added. The spray gun hose fitting 20' and the extension hose fitting 40' in this case have a single sealing o-ring 32', 55', respectively, corresponding to the larger diameter sealing o-rings in the previously described embodiment. The fittings 20', 40' again have connecting stems 26',42', respectively, which each include a relatively larger diameter inner hub portion 29', 51', and an outer smaller diameter hub portion 28', 50', respectively. The o-rings 32', 55', are disposed between the larger and smaller diameter hub portions.

With the coupling fully assembled in the adapter 60', as depicted in FIG. 5, the o-ring 55' of the extension hose fitting 40' is maintained in biased sealing engagement with a chamfered end 70' of the adapter 60' by the retaining ring 71'. The connecting stem 26' of the extension hose fitting 20' is positioned with the hub portions 28', 29' both within the larger diameter chamber 69L' of the adapter 60' and with the o-ring being in sealed engagement with an internal wall of the chamber 69L' and retained in such position by the threadedly engaged retainer ring 74'.

To uncouple the coupling while in a pressurized state, the retaining ring 71' of the extension hose fitting 40' may be loosened, such as by one or two turns, to permit pressurized fluid within the system to break the seal between the o-ring 55' and the chamfered end of the adapter 60' and permit gradual control venting of the pressure buildup to atmosphere, while the retaining ring 71' secures the coupling in such loosened condition. Alternatively, the retaining ring 74' of the extension hose fitting 20' may be loosened by turning up the retaining ring 74' a sufficient number of turns to cause pressure within the system to move the stem 26' and o-ring 32' sufficiently outwardly of the adapter chamber 69L' to permit breakage of the seal between the o-ring 32' and the wall of the chamber 69L' to enable controlled venting of the pressure buildup to atmosphere while the retaining ring 74' secures the coupling in such loosened condition. Again, it will be appreciated by one skilled in the art that the fittings 20', 40' can be universally used with different sized outlet fittings of a pressure washer or other components of a pressurized hydraulic system in a similar manner.

Figure 8:
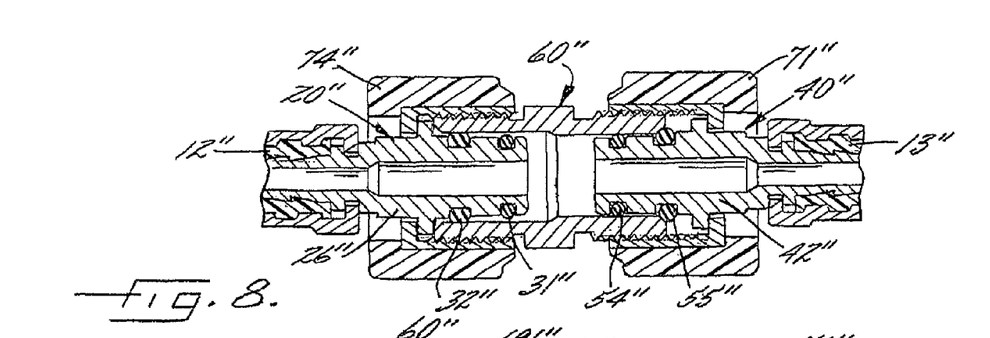
FIGS. 8-10 are fragmentary sections, similar to FIGS. 2-4 and 5-7, showing another alternative embodiment of hose coupling in accordance with the invention.
Figure 9:
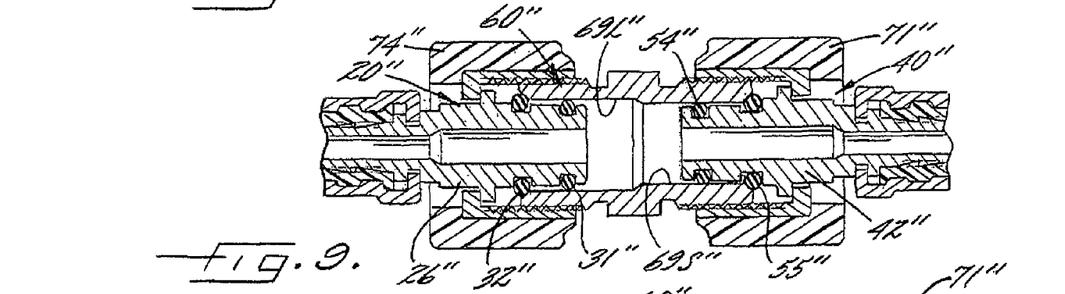
Figure 10:
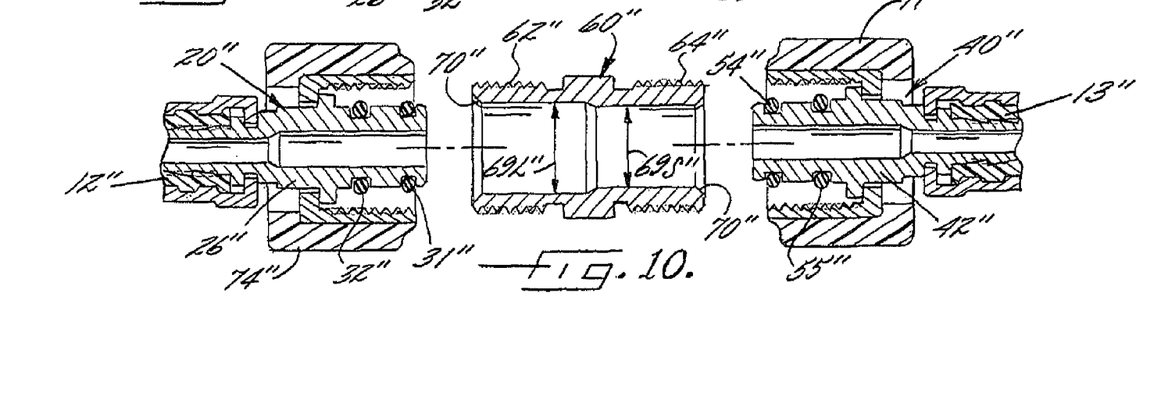

With reference to FIGS. 8-10, there is shown another alternative embodiment of a high pressure hose coupling in accordance with the invention wherein items similar to those described above have been given similar reference numerals with the distinguishing suffix "double prime" ("). The spray gun hose fitting 20" and the extension hose fitting 40" in this case each have connecting stems 26",42" with a pair axially spaced o-rings 31",32" and 54",55" similar to the embodiment of FIGS. 2-4, but without a radial venting passageway. When in the assembled condition, as depicted in FIG. 8, the o-rings similarly cooperate with the adapter 60" to provide a sealed coupling during operation of the pressure washer.

To release pressure buildup following usage of the pressure washer, the retaining ring 74" of the extension hose fitting 20" may be turned a turn or two to permit pressure within the system to break the seal between the o-ring 32" and the chamfered end of the adapter 60" to permit controlled venting of the internal buildup pressure in the system through a small space between the smaller diameter o-ring 31" and the internal wall of the chamber 69L" and the pressure break between the larger diameter o-ring 32" and the end of the adapter 60 to atmosphere. Again, the retaining ring 74" remains in threaded engagement with the adapter 60" to maintain the controlled released of the pressure buildup.

Alternatively, pressure buildup within the system may be relieved following usage by unscrewing the retainer ring 71" of the extension hose fitting 40" sufficiently to remove both the larger diameter o-ring 55" and the smaller diameter o-ring 54" from sealed engagement with the chamber 69S", while the retaining ring 71 remains in threaded engagement with the adapter 60". Again, the fittings 20" and 40" can be universally used with different sized outlet fittings of the pressure washer or other components of the pressurized system for permitting gradual release of pressure buildup as an incident to uncoupling of the fittings.

From the foregoing, it can be seen that a high pressure hydraulic system is provided, such as a pressure washer system, having hose with couplings adapted for reliable coupling of the hose to an associated component of the high pressure system, as well as safe uncoupling of the hose from the component when the system remains in a highly-pressurized state. The couplings permit the gradual diffusion of high pressure within the system during loosening and disconnection of the system without dangerous sudden bursts of pressure fluid. The couplings further are relatively simple in construction and are adapted for universal use with multi-sized fittings of associated components of the pressurized liquid system.

What is claimed:

1. A spraying apparatus comprising:
    a power operated pressure washer unit adapted for generating a high pressure liquid discharge at a liquid outlet thereof,
    an outlet fitting in fluid communication with said pressure washer liquid outlet,
    a spray gun having a high pressure liquid supply hose with a connector fitting at an upstream end thereof,
        said connector fitting having an axial stem having a central liquid passageway positionable into said outlet fitting for communicating liquid through said connector fitting between said outlet fitting and said high pressure liquid supply hose,
        at least two axially-spaced annular sealing members disposed about said connector fitting axial stem, said connector fitting having a retaining ring threadably engageable with said outlet fitting for securing said axial stem in said outlet fitting with at least one of said annular sealing members in sealing engagement with said outlet fitting, said retaining ring being rotatable in a first direction for screwing said connector fitting onto said outlet fitting, and said retaining ring being rotatable in an opposite direction for unscrewing the retaining ring from the outlet fitting to permit removal of the connector fitting from the outlet fitting, and
        said connector fitting having a transverse passageway communicating from said central passageway outwardly through said axial stem at a location between at least two of said axially spaced annular sealing members such that upon unscrewing of said retaining ring from said outlet fitting a high pressure buildup within the high pressure liquid supply hose and outlet fitting is permitted to gradually dissipate and vent through the transverse passageway while said retaining ring retains said connector fitting on said outlet fitting.

2. The spraying apparatus of claim 1 in which said transverse passageway extends radially through said connector fitting.

3. The spraying apparatus of claim 1 in which one of said annular sealing members is disposed adjacent a terminal end of said axial stem, and as an incident to unscrewing of said retaining ring a high pressure buildup within the high pressure liquid supply hose and outlet fitting is vented outwardly through said transverse stem passageway and about said one annular sealing member disposed adjacent a terminal end of said axial stem.

4. The spraying apparatus of claim 1 in which said outlet fitting that is in fluid communication with said liquid outlet includes an adapter that is connectable to a high pressure hose segment.

5. The spraying apparatus of claim 1 in which said connector fitting axial stem has a first hub portion effective for sealed coupling of the connector fitting with an outlet fitting having a first relatively small diameter liquid discharge outlet and a second hub portion relatively larger in diameter than said first hub portion effective for sealed coupling of said hose fitting with an outlet fitting having a second relatively large diameter greater than said small diameter of said liquid discharge outlet.

6. The spraying apparatus of claim 5 wherein said outlet fitting further includes a connecting stem which has a first hub portion and a second hub portion, and one of said annular sealing members is disposed adjacent said first hub portion and the other of said annular sealing members is disposed adjacent said second hub portion.

7. A high pressure hose for use in communicating high pressure liquid from an outlet fitting of a pressure washer comprising:
    a tubular hose segment having a connector fitting connected to an end of said tubular hose segment,
    said connector fitting having an axial stem having a central liquid passageway positionable into the outlet fitting for communicating liquid through said connector fitting between said outlet fitting and said tubular hose segment,
    at least two axially-spaced annular sealing members disposed about said axial stem, said connector fitting having a retaining ring threadably engageable with said outlet fitting for securing said axial stem in said outlet fitting with at least one of said annular sealing members in sealing engagement with said outlet fitting, said retaining ring being rotatable in a first direction for screwing said connector fitting onto said outlet fitting, and said retaining ring being rotatable in an opposite direction for unscrewing the retaining ring from the outlet fitting to permit removal of the connector fitting from the outlet fitting, and
    said connector fitting having a transverse passageway communicating from said central passageway outwardly through said axial stem at a location between at least two of said axially spaced annular sealing members such that upon unscrewing of said retaining ring from said outlet fitting at least a portion of a high pressure buildup within the tubular hose segment and outlet fitting is permitted to gradually dissipate and vent through the transverse passageway while said retaining ring retains said connector fitting on said outlet fitting.

8. The high pressure hose of claim 7 in which one of said annular sealing members is disposed adjacent a terminal end of said axial stem, and as an incident to unscrewing of said retaining ring high pressure liquid is vented outwardly through said transverse passageway and about said one of said annular sealing members disposed adjacent said terminal end of said axial stem.

9. The high pressure hose of claim 7 in which said axial stem has a first hub portion effective for sealed coupling of the connector fitting with an outlet fitting having a first relatively small diameter liquid discharge outlet and a second hub portion relatively larger in diameter than said first hub portion effective for sealed coupling of said connector fitting with an outlet fitting having a second relatively large diameter greater than said small diameter of said liquid discharge outlet.

10. The high pressure hose of claim 9 in which one of said at least two annular sealing members is disposed adjacent said first hub portion and a second of said annular sealing members is disposed adjacent said second hub portion.

11. The spraying apparatus of claim 1 wherein when said high pressure buildup is permitted to gradually dissipate and vent through the transverse passageway, at least one of said annular sealing members remains in sealed engagement with said outlet fitting.

12. The high pressure hose of claim 7 wherein when said high pressure buildup is permitted to gradually dissipate and vent through the transverse passageway, at least one of said annular sealing members remains in sealed engagement with said outlet fitting.

13. A connector fitting for connection to and use in communicating high pressure liquid through a second fitting, said connector fitting comprising:
- an axial stem formed with a central liquid passageway;
- at least two axially-spaced annular sealing members disposed about said axial stem;
- a transverse passageway communicating from said central passageway outwardly through said axial stem at a location between two of said axially spaced annular sealing members;
- a retaining member engageable with said second fitting for securing said axial stem in an extension of said second fitting; wherein said retaining member is movable between a first position where at least one of said annular sealing members is in sealing engagement with said second fitting and a second position where at least a portion of a high pressure buildup can gradually dissipate and vent through the transverse passageway while said retaining member retains said connector fitting on said second fitting.

14. The connector fitting of claim 13 in which said axial stem of said connector fitting has a first hub portion effective for sealed coupling of said connector fitting with the second fitting and having a first relatively small diameter liquid discharge outlet and a second hub portion relatively larger in diameter than said first hub portion effective for sealed coupling of said connector fitting with the second fitting and having a second relatively larger diameter liquid discharge outlet.

15. The connector fitting of claim 14 in which one of the annular sealing members is disposed adjacent said first hub portion and a second of the annular sealing members is disposed adjacent said second hub portion.

16. The connector fitting of claim 13 wherein when said high pressure buildup is permitted to gradually dissipate and vent through the transverse passageway, at least one of said annular sealing members remains in sealed engagement with said second fitting.

* * * * *

UNITED STATES PATENT AND TRADEMARK OFFICE
CERTIFICATE OF CORRECTION

PATENT NO. : 7,744,018 B2 Page 1 of 1
APPLICATION NO. : 11/804365
DATED : June 29, 2010
INVENTOR(S) : Gus Alexander, Morgan McCarthy and John Planetto It is certified that error appears in the above-identified patent and that said Letters Patent is hereby corrected as shown below:

On the Title Page, Item (73) Assignee reading "FAIP North America, Inc." should read --FNA IP Holdings, Inc.--

Signed and Sealed this

Seventeenth Day of August, 2010

David J. Kappos
*Director of the United States Patent and Trademark Office*